United States Patent
Line et al.

(10) Patent No.: US 10,836,286 B2
(45) Date of Patent: Nov. 17, 2020

(54) MODULAR SUSPENSION SEATBACK WITH INTEGRATED UPPER AND LOWER SUPPORTS

(71) Applicant: Ford Global Technologies, LLC, Dearborn, MI (US)

(72) Inventors: Johnathan Andrew Line, Northville, MI (US); Spencer Robert Hoernke, Dundas (CA); Michael Steven Medoro, Livonia, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 16/262,569

(22) Filed: Jan. 30, 2019

(65) Prior Publication Data

US 2020/0238869 A1    Jul. 30, 2020

(51) Int. Cl.
| | |
|---|---|
| *B60N 2/66* | (2006.01) |
| *B60N 2/22* | (2006.01) |
| *B60N 2/58* | (2006.01) |
| *B60N 2/42* | (2006.01) |
| *A47C 7/46* | (2006.01) |

(52) U.S. Cl.
CPC ......... *B60N 2/6671* (2015.04); *B60N 2/2222* (2013.01); *B60N 2/4228* (2013.01); *B60N 2/58* (2013.01); *B60N 2/6673* (2015.04); *A47C 7/46* (2013.01); *B60N 2/66* (2013.01); *B60N 2/663* (2015.04); *B60N 2/665* (2015.04); *B60N 2/666* (2015.04); *B60N 2/667* (2015.04)

(58) Field of Classification Search
CPC .......... B60N 2/66; B60N 2/663; B60N 2/665; B60N 2/666; B60N 2/667; B60N 2/6671; B60N 2/6673; B60N 2/2222; B60N 2/4228; B60N 2/58; A47C 7/46
USPC ...................................................... 297/180.14
See application file for complete search history.

(56) References Cited

U.S. PATENT DOCUMENTS

| | | | |
|---|---|---|---|
| 3,709,559 A | 1/1973 | Rowland | |
| 4,564,235 A * | 1/1986 | Hatsutta | B60N 2/66 297/284.4 |
| 5,174,526 A | 12/1992 | Kanigowski | |
| 5,217,278 A * | 6/1993 | Harrison | B60N 2/0296 192/48.91 |
| 5,826,937 A | 10/1998 | Massara | |
| 5,884,968 A | 3/1999 | Massara | |
| 6,530,622 B1 * | 3/2003 | Ekern | B60N 2/2222 297/284.1 |
| 6,554,365 B2 * | 4/2003 | Karschin | A47C 7/40 297/440.14 |
| 6,565,153 B2 | 5/2003 | Hensel et al. | |
| 6,631,951 B2 * | 10/2003 | Blendea | B60N 2/6673 297/284.4 |

(Continued)

*Primary Examiner* — Syed A Islam
(74) *Attorney, Agent, or Firm* — David Coppiellie; Price Heneveld LLP

(57) ABSTRACT

A seating assembly includes a seatback. The seatback includes a frame extending about a periphery of the seatback. The seatback defines a thoracic region and a lumbar region. First and second supports extend from a top portion of the frame to a lower portion of the frame. A first flexible mat and a second flexible mat are operably coupled with the first and second supports. The first flexible mat is disposed proximate the thoracic region. The second flexible mat is disposed proximate the lumbar region.

19 Claims, 16 Drawing Sheets

(56) References Cited

U.S. PATENT DOCUMENTS

| | | | | |
|---|---|---|---|---|
| 6,644,740 | B2* | 11/2003 | Holst | B60N 2/0232 |
| | | | | 297/284.4 |
| 7,607,739 | B2* | 10/2009 | Browne | B60N 2/5621 |
| | | | | 297/180.1 |
| 7,677,657 | B2* | 3/2010 | Park | B60N 2/888 |
| | | | | 297/216.12 |
| 7,841,663 | B2* | 11/2010 | Nathan | B60N 2/002 |
| | | | | 297/284.7 |
| 7,862,119 | B2* | 1/2011 | Schafer | B60N 2/6673 |
| | | | | 297/284.8 |
| 7,963,595 | B2* | 6/2011 | Ito | B60N 2/809 |
| | | | | 297/180.14 |
| 8,454,090 | B2* | 6/2013 | Colja | B60N 2/666 |
| | | | | 297/284.4 |
| 8,608,243 | B2* | 12/2013 | Maeda | B60N 2/976 |
| | | | | 297/284.4 |
| 8,727,434 | B2* | 5/2014 | Sahashi | B60N 2/5635 |
| | | | | 297/180.13 |
| 8,998,311 | B2* | 4/2015 | Axakov | B60N 2/5635 |
| | | | | 297/180.13 |
| 9,073,466 | B2* | 7/2015 | Ota | B60N 2/5664 |
| 9,193,280 | B2* | 11/2015 | McMillen | B60N 2/66 |
| 9,326,614 | B2* | 5/2016 | Suzuki | A47C 7/462 |
| 9,783,088 | B2* | 10/2017 | Akaike | B60N 2/5657 |
| 9,796,307 | B2* | 10/2017 | Awatani | B60N 2/5635 |
| 9,975,460 | B2* | 5/2018 | Bhatia | B60N 2/6673 |
| 10,278,509 | B2* | 5/2019 | Fujita | A47C 31/006 |
| 2006/0175877 | A1* | 8/2006 | Alionte | B60N 2/5635 |
| | | | | 297/180.14 |
| 2007/0106188 | A1* | 5/2007 | Walker | B60N 2/666 |
| | | | | 602/19 |
| 2007/0236071 | A1 | 10/2007 | Fujita et al. | |
| 2007/0262621 | A1* | 11/2007 | Dong | B60N 2/5635 |
| | | | | 297/180.12 |
| 2010/0187874 | A1* | 7/2010 | Matsui | B60N 2/4228 |
| | | | | 297/216.12 |
| 2013/0285426 | A1 | 10/2013 | Arant et al. | |
| 2016/0288681 | A1 | 10/2016 | Ferretti et al. | |

* cited by examiner

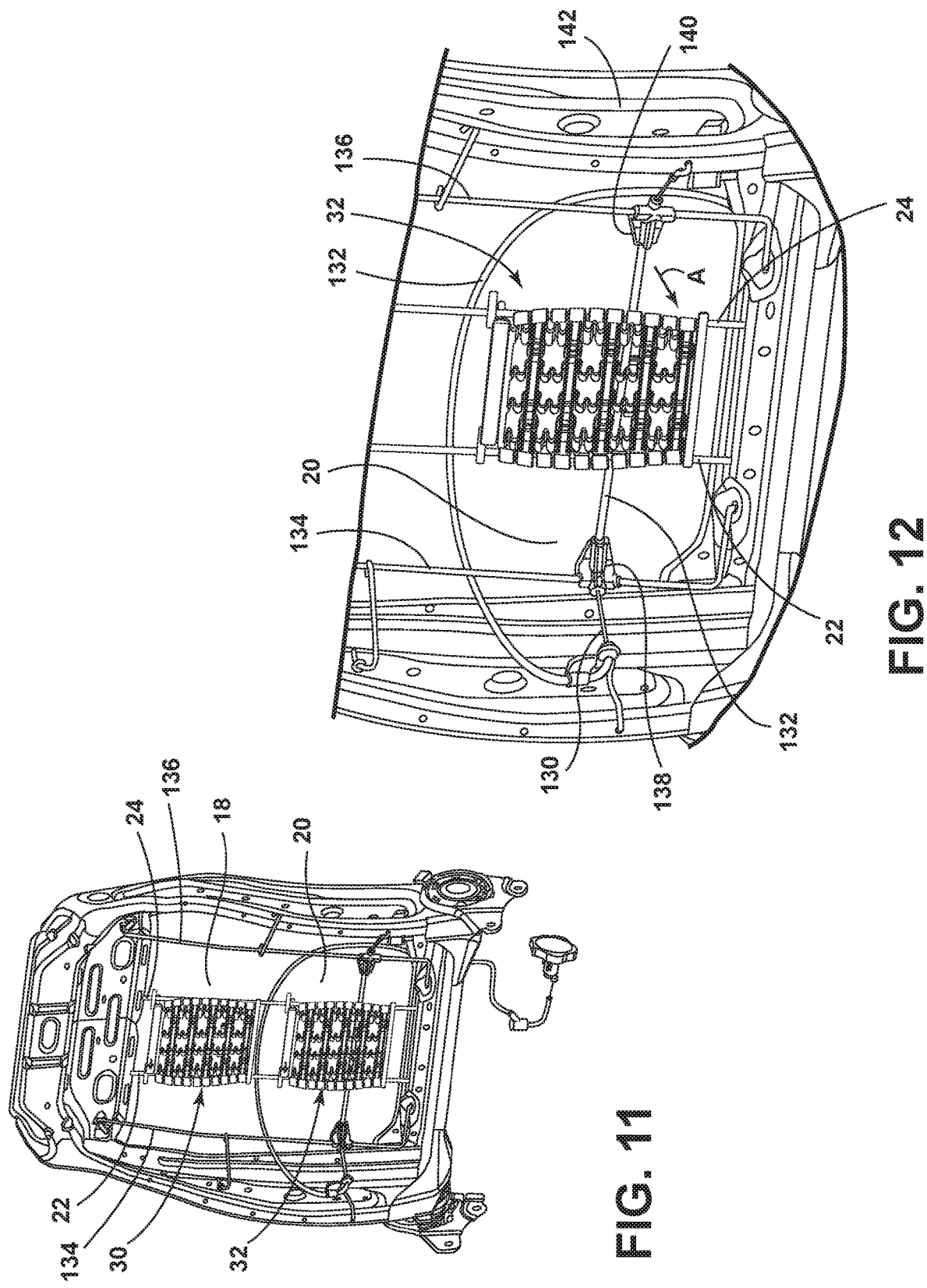

MODULAR SUSPENSION SEATBACK WITH INTEGRATED UPPER AND LOWER SUPPORTS

FIELD OF THE DISCLOSURE

The present disclosure generally relates to a seating assembly for a vehicle, and more specifically, to a seating assembly including a modular suspension seatback with integrated upper and lower supports.

BACKGROUND OF THE DISCLOSURE

Seating assemblies with lean, thin profiles provide additional space within a vehicle. However, the seating assemblies often lack features that aid in comfortability and climate control. Thin seat structures that include these features would be beneficial.

SUMMARY OF THE DISCLOSURE

According to one aspect of the present disclosure, a seating assembly includes a seatback. The seatback includes a frame extending about a periphery of the seatback. The seatback defines a thoracic region and a lumbar region. First and second supports extend from a top portion of the frame to a lower portion of the frame. A first flexible mat and a second flexible mat are operably coupled with the first and second supports. The first flexible mat is disposed proximate the thoracic region. The second flexible mat is disposed proximate the lumbar region.

Embodiments of the first aspect of the disclosure can include any one or a combination of the following features:
  the first flexible mat and the second flexible mat include a substantially identical construction;
  corners of the first flexible mat are operably coupled with the first and second supports;
  each of the first flexible mat and the second flexible mat includes snap features configured to receive the first and second supports
  each of the first and second supports are one of a metallic wire member and a metallic spring steel member;
  the first flexible mat and the second flexible mat are linearly slidable along the first and second supports;
  the first flexible mat and the second flexible mat flex forward toward a support surface of the seatback;
  the first flexible mat and the second flexible mat are independently adjustable;
  an air mover is disposed between the first flexible mat and the second flexible mat;
  a blower extends between upper and lower cross supports that are moveably adjustable vertically along the first and second supports;
  the upper and lower cross supports include a circular blower receiving area configured to receive the air mover that is in fluid communication with the seatback;
  each of the first flexible mat and the second flexible mat are operable between an un-flexed condition and a flexed condition, and wherein each of the first flexible mat and the second flexible mat are in a more arcuate configuration when in the flexed condition and in a less arcuate configuration when in the un-flexed condition;
  each of the first flexible mat and the second flexible mat are configured to flatten and absorb energy during a rear impact collision;
  a motor is operably coupled with the first flexible mat and the second flexible mat, the motor configured to move each of the first flexible mat and the second flexible mat from an un-flexed condition to a flexed condition; and
  the motor is configured to adjust each of the first flexible mat and the second flexible mat individually.

According to another aspect of the present disclosure, a vehicle seating assembly includes a seat and a seatback operably coupled to the seat. The seatback includes a frame extending about a periphery of the seatback. The seatback defines a thoracic region and a lumbar region. An open weave mesh is supported by the frame and defines a seat surface interface configured to support a user. First and second supports extend from a top portion of the frame to a lower portion of the frame. A first flexible mat and a second flexible mat are operably coupled with the first and second supports. The first flexible mat is disposed proximate the thoracic region. The second flexible mat is disposed proximate the lumbar region.

Embodiments of the second aspect of the disclosure can include any one or a combination of the following features:
  the first flexible mat and the second flexible mat are linearly slidable along the first and second supports;
  a motor is operably coupled with the first flexible mat and the second flexible mat, the motor configured to move each of the first flexible mat and the second flexible mat from an un-flexed condition to a flexed conditions; and
  the motor is configured to adjust each of the first flexible mat and the second flexible mat individually.

According to yet another aspect of the present disclosure, a vehicle seating assembly includes a seatback having a frame. An open weave mesh is supported by the frame and defines a seat surface interface. First and second supports extend from a top to a bottom of the frame. A first flexible mat is operably coupled with the first and second supports. The first flexible mat is disposed proximate a thoracic region. A second flexible mat is operably coupled with the first and second supports. The second flexible mat is disposed proximate a lumbar region.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is a side perspective view of a flexible mat operably coupled with first and second supports;

FIG. 12 is an enlarged view of a lower flexible mat prior to deployment to a fully flexed condition;

DETAILED DESCRIPTION

Figure 1:
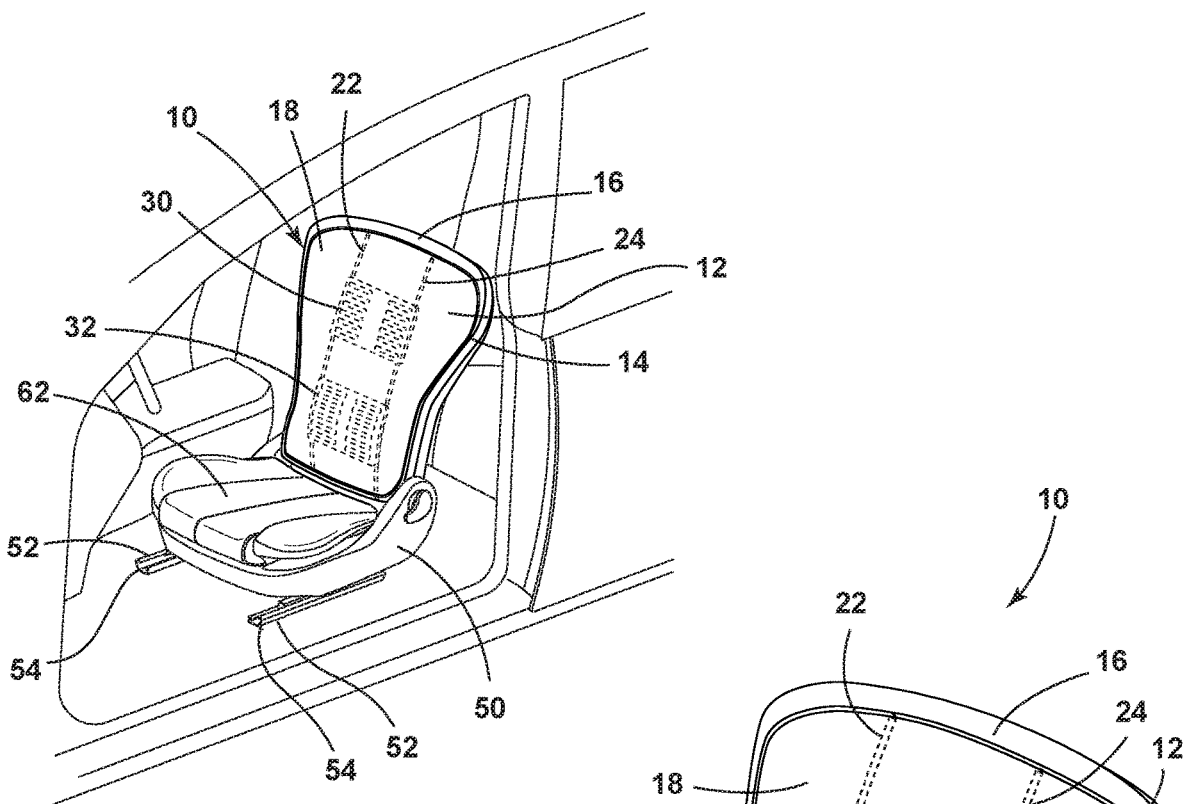
FIG. 1 is a top perspective view of one embodiment of a seating assembly of the present disclosure disposed in a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-28, reference number 10 generally designates a seating assembly. The seating assembly 10 includes a seatback 12. The seatback 12 includes a frame 14 extending about a periphery 16 of the seatback 12. The seatback 12 defines a thoracic region 18 and a lumbar region 20. First and second supports 22, 24 extend from a top portion 26 of the frame 14 to a lower portion 28 of the frame 14. A first flexible mat 30 and a second flexible mat 32 are operably coupled with the first and second supports 22, 24. The first flexible mat 30 is disposed proximate the thoracic region 18. The second flexible mat 32 is disposed proximate the lumbar region 20.

With reference again to FIGS. 1 and 2, the seating assembly 10 may be used in any vehicle, such as a car, a truck, a van, etc. It is also contemplated that the concept set forth in this disclosure may be utilized in a front or forward position of the vehicle as well as a rear or rearward position of the vehicle. The seating assembly 10, as illustrated, includes a seat base 50 that includes a slide assembly 52 having rails 54 configured to support slides 60, and which allows for fore and aft movement of the vehicle seating assembly 10 relative to the vehicle. A seat 62 is operably coupled with the seat base 50 and is movable relative thereto. The seatback 12 of the vehicle seating assembly 10 may include a head restraint. Each of the components of the seatback 12 may be configured for adjustability to properly support the weight of various occupants inside the vehicle.

In an effort to optimize space and increase fuel efficiency, vehicle manufactures are seeking additional ways to achieve thin-styled seats and seatbacks with enhanced comfort features and options. Various features configured to optimize vehicle seat and seatback comfort have also been implemented in an effort to increase passenger comfortability during travel. Packaging enhanced comfort features in a thin seatback presents difficult challenges, but not without reasonable solutions. One manner of providing a thin vehicle seatback is to include mesh seatback constructions. However, mesh seatback constructions may have more unpredictable energy management depending on occupant size, and management of temperatures at the vehicle seatback are sometimes difficult to maintain or change.

Figure 2:
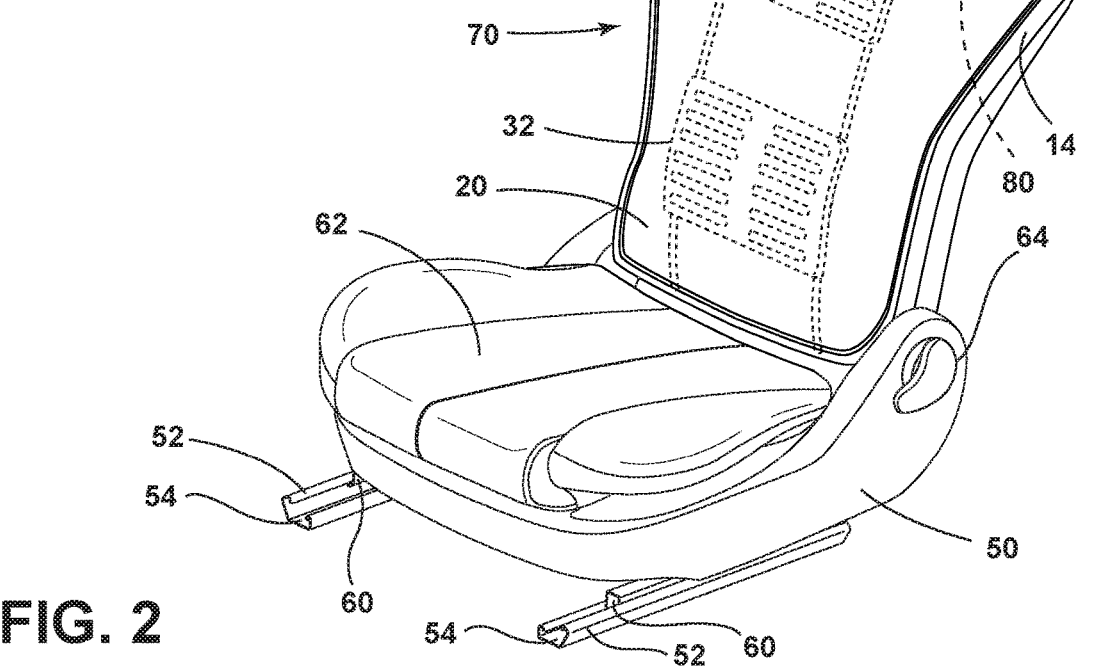
FIG. 2 is a top perspective view of the seating assembly of FIG. 1.

FIGS. 1 and 2 illustrate a secondary modular suspension system 70 for the seatback 12 that includes suspension assemblies that can be added or removed from the seatback 12 depending on price point and without affecting the appearance of the seatback 12. Utilization of the secondary modular suspension system 70 allows for the remainder of the seatback 12 to remain unchanged and independent for purposes of contenting and decontenting. Accordingly, tooling and fixture costs are reduced and complexity is minimized. In addition, implementation of the secondary modular suspension system 70 creates a known reaction surface configured to support an occupant during a dynamic event (such as a collision event) and transfer loads to structural members (for example, the frame 14) resulting in a consistent and predictable energy path.

Figure 3:
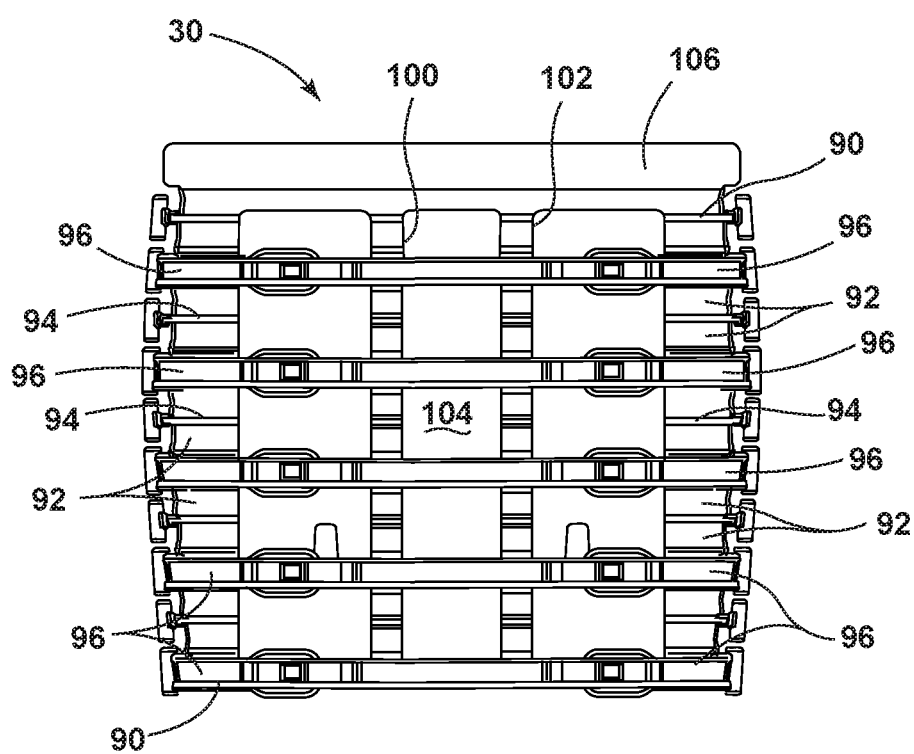
FIG. 3 is a top plan view of a flexible mat.
Figure 4:
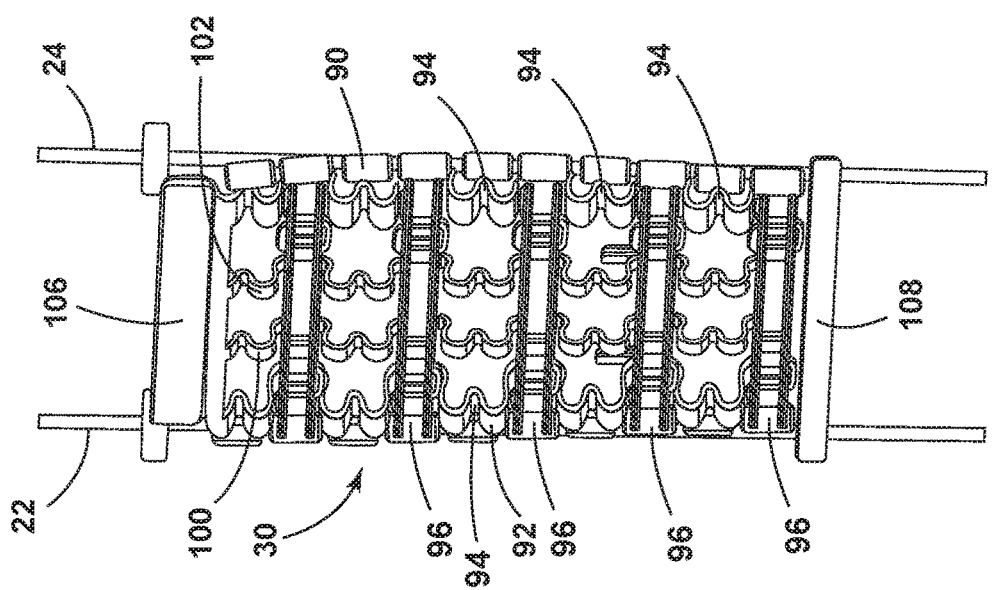
FIG. 4 is a side perspective view of a flexible mat in a flat condition and operably coupled with a seat frame.

With reference again to FIGS. 1 and 2, as well as FIGS. 3 and 4, the illustrated seatback 12 includes the secondary modular suspension system 70 configured for use in a thin seat construction having a mesh back 80. The secondary modular suspension system 70 includes the first and second flexible mats 30, 32 that are configured for movement on the first and second supports 22, 24. The first and second flexible mats 30, 32 include a "tank tread" configuration that allows the first and second flexible mats 30, 32 to flex or bow outward from a flat state (FIG. 4) to a curved or flexed state (FIG. 5) to accommodate a preferred comfort level of a passenger. The first and second flexible mats 30, 32 are configured for movement from the flat state to the flexed state by way of mechanical systems that include cables or motorized systems. Significantly, the secondary modular suspension system 70 as set forth herein is configured to allow the first and second flexible mats 30, 32 to flex forward until the first and second flexible mats 30, 32 contact the mesh back 80 that defines the seating surface, but do not travel forward into the mesh back 80 a significant distance, and thus the first and second flexible mats 30, 32 do not protrude into an occupant's back, altering or minimizing comfort to the occupant. In addition, the first and second flexible mats 30, 32 include a geometry that when positioned in a flexed state will still move and deform as a load is applied to the first and second flexible mats 30, 32. As a result, the first and second flexible mats 30, 32 absorb energy as an occupant is pushed into the seatback 12, transferring energy loads into the first and second supports 22, 24, and ultimately to the seatback frame 14.

Figure 5:
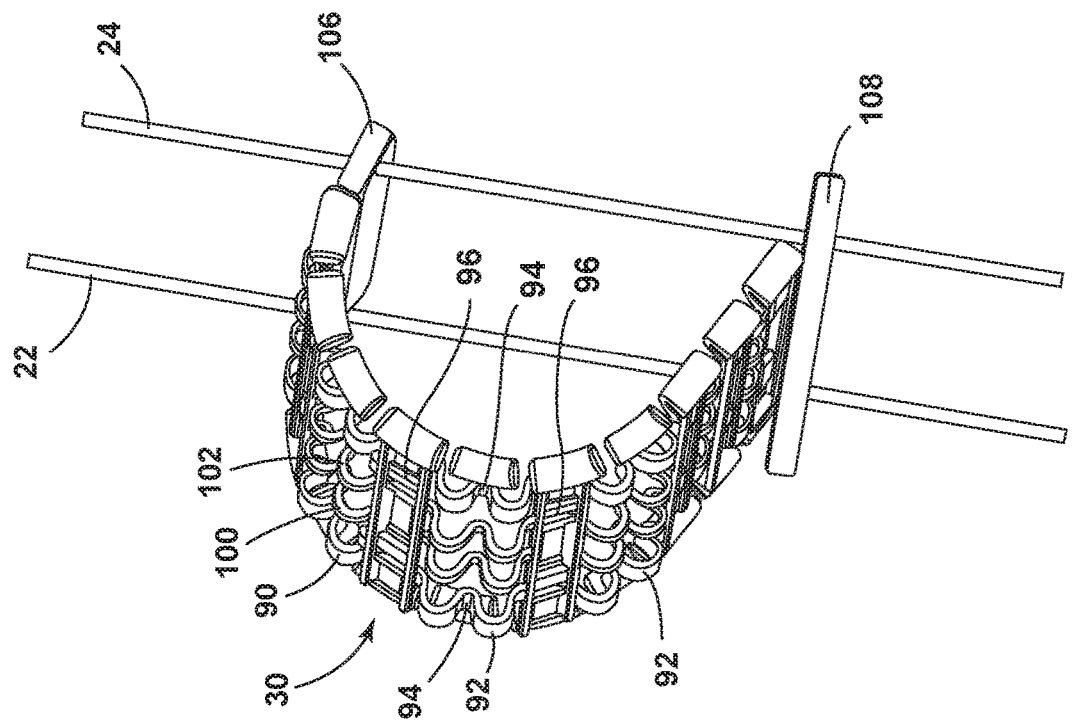
FIG. 5 is a side perspective view of a flexible mat operably coupled with first and second supports and moved to a fully flexed condition.

With reference now to FIGS. 3-5, the first flexible mat 30 and the second flexible mat 32 are illustrated. Each of the first and second flexible mats 30, 32 includes a generally flexible, but solid periphery 90 with a plurality of undulating support members 92 disposed thereat. A plurality of valley portions 94 are defined by the plurality of undulating support members 92. The plurality of undulating support members 92 are disposed between braces 96, which extend across each of the first and second flexible mats 30, 32. In addition, each of the first and second flexible mats 30, 32 includes two flexible central columns 100, 102 configured to provide rigidity in an internal portion of the first and second flexible mats 30, 32. The two flexible central columns 100, 102 provide rigidity, but less so than the periphery 90. The first and second flexible mats 30, 32 may generally include an open matrix 104 that is configured to allow for airflow into and out of the seatback 12. In addition, it will be understood that the first and second flexible mats 30, 32 may be constructed from a single integral piece of material without any mechanical hinges. A top portion of each of the first and the second flexible mats includes a top crossbar 106, while a bottom portion includes a bottom crossbar 108 (FIGS. 4 and 5).

Figure 6:
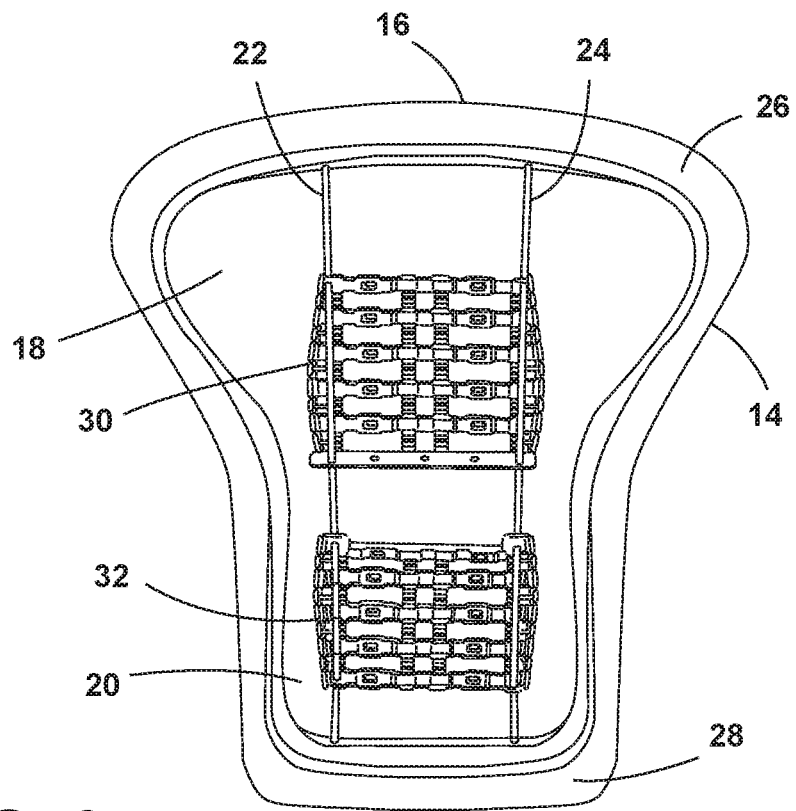
FIG. 6 is a rear elevational view of a seatback with flexible mats of the present disclosure.
Figure 7:
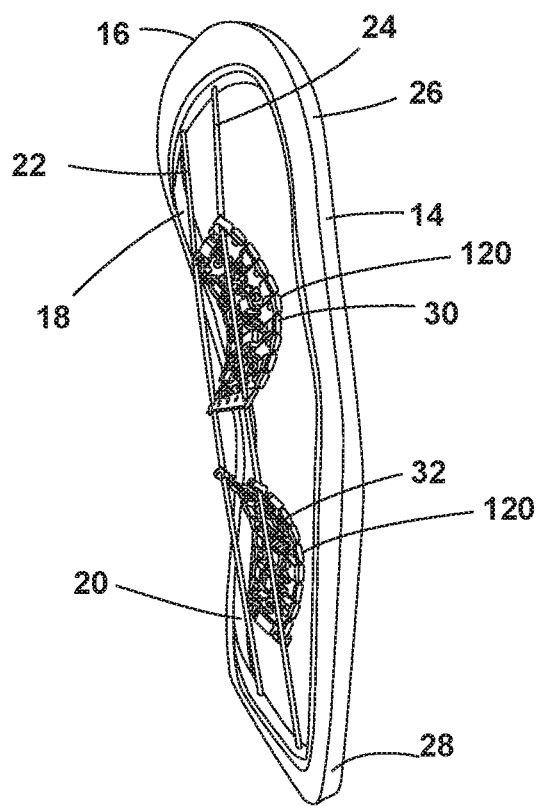
FIG. 7 is a side elevational view of the seatback of FIG. 6.

As shown in FIGS. 6 and 7, the first and second flexible mats 30, 32 are generally centrally disposed between opposing sides of the frame 14 of the seatback 12. The first flexible mat 30 is positioned below the second flexible mat 32. The first flexible mat 30 is configured to support the thoracic region 18 of an occupant. The second flexible mat 32 is configured to support the lumbar region 20 of an occupant. The first flexible mat 30 may be moved to a generally flat condition such that minimal support is provided to the back of a user. Alternatively, as set forth herein, the first flexible mat 30 may be adjusted so that the first flexible mat 30 arcs or flexes forward such that an apex 120 of the first flexible mat 30 slightly protrudes into, abuts, or is disposed behind the flexible mesh back 80 defining the seating surface of the seatback 12. Notably, the arched geometry that is molded into the first flexible mat 30 can be adjusted during manufacture to limit travel that is created during a collision event when the material, and specifically, the first flexible mat 30, is pushed rearward. In addition, with reference to FIG. 7, as the first flexible mat 30 is activated, gaps between the semi-circular nature of the plurality of undulating support members 92, increase thereby allowing for increased flex and greater user comfort. The increase in flex prevents the user from feeling isolated hot zone areas by displacing the force over a greater area and decreasing pressure. Stated differently, the apex 120 of the first flexible mat 30 is spread over a substantially large area proximate the apex 120 such that a point or line of pressure in the seatback 12 is not felt by the occupant.

Figure 10:
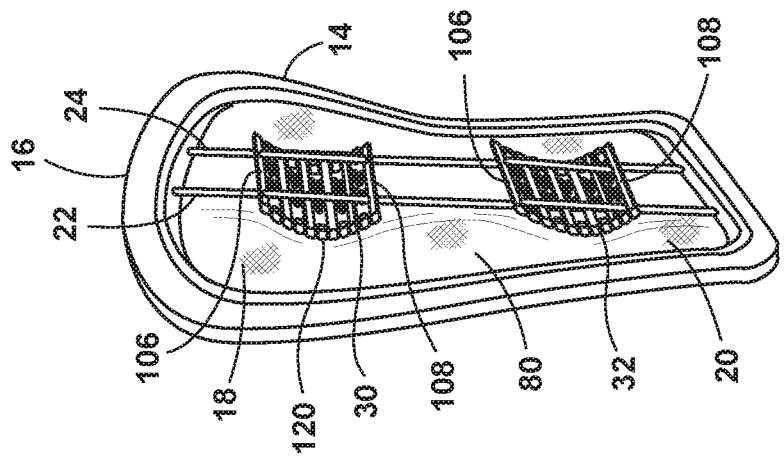
FIG. 10 is a side rear perspective view of the seatback of FIG. 6.
Figure 9:
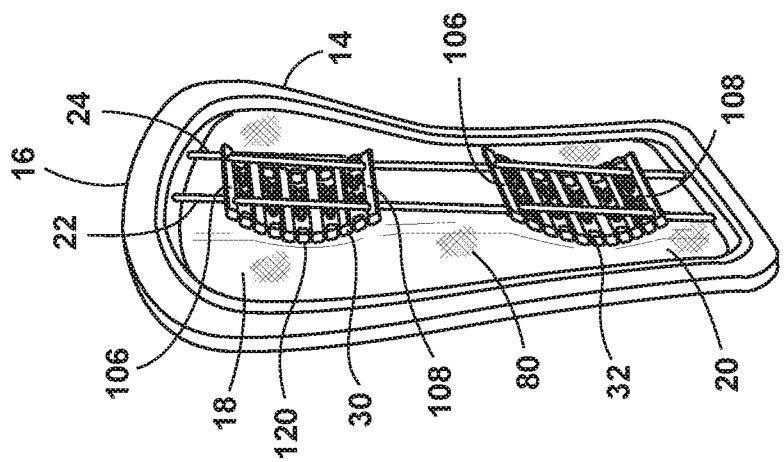
FIG. 9 is a side rear perspective view of the seatback of FIG. 6.
Figure 8:
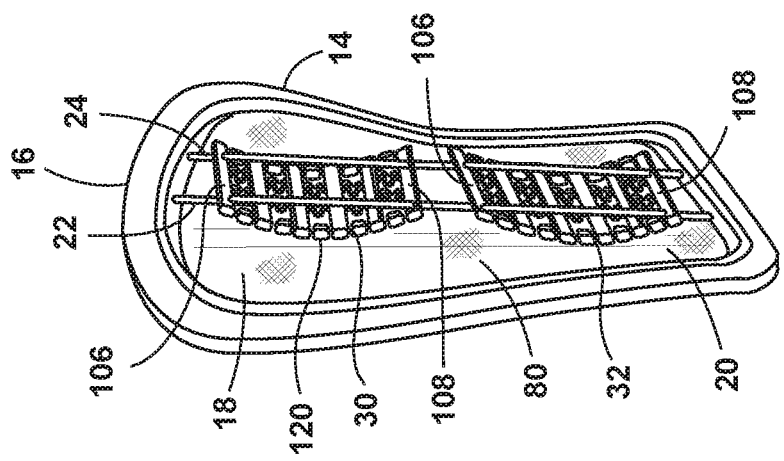
FIG. 8 is a side rear perspective view of the seatback of FIG. 6.

With reference now to FIGS. 8-10, movement of the first flexible mat 30 and the second flexible mat 32 will be addressed. As can be seen in FIG. 8, the first flexible mat 30 can be moved to a flat condition that is flat or nearly flat. In this position, the load associated with the weight of the back of an occupant will result in the mesh back 80 of the seating surface acting as part of the primary suspension system and absorbing much of the load from the occupant. Further, during a collision event, the mesh back 80 that defines the seating surface may only slightly, or may not at all, interface with the first flexible mat 30. However, the first flexible mat 30 may be adjusted such that the bottom crossbar 108 of the first flexible mat 30 is drawn closer to the top crossbar 106 of the first flexible mat 30, or conversely, the top crossbar 106 of the first flexible mat 30 is drawn downward toward the bottom crossbar 108 of the first flexible mat 30. Alternatively, both the top and the bottom crossbars 106, 108 may be drawn together simultaneously. Regardless, the first flexible mat 30 begins to flex forward toward the upper back or thoracic region of the occupant. As previously noted, as the first flexible mat 30 begins to flex forward, the apex 120 of the first flexible mat 30 is drawn closer to the flexible mesh back 80 that defines the seating surface of the seatback 12. It is generally contemplated that the apex 120 may protrude slightly into the flexible mesh back 80 (FIG. 10), rest adjacent to the flexible mesh back 80 (FIG. 9), or rest behind the flexible mesh back 80 (FIG. 8). However, in any of these instances, the first flexible mat 30 is configured to absorb energy from the body of an occupant during a rear collision event. Although, only the first flexible mat 30 is shown proximate the thoracic region 18, it will be understood that the second flexible mat 32 operates in a similar manner, but is arranged below the first flexible mat 30 and supports the lumbar region 20.

With reference now to FIGS. 11 and 12, one manner of actuating the first flexible mat 30 and the second flexible mat 32 is illustrated. Specifically, for example in the lumbar region 20, the second flexible mat 32 may include a Bowden cable 130 that is linked to sides of the second flexible mat 32 behind the second flexible mat 32. The Bowden cable 130 and the sheath 132 are engaged with side cable supports 134, 136 at junctions 138, 140. The side cable supports 134, 136 are forward of the first and second supports 22, 24. As the Bowden cable 130 is drawn through a sheath 132, the sheath 132 behind the second flexible mat 32 is drawn forward which also draws the second flexible mat 32 forward relative to the side cable supports 134, 136 adjacent the frame. As a result, the second flexible mat 32 begins to flex forward, in the direction of Arrow A, toward the lumbar region of the occupant. Alternatively, other manners of drawing the apex 120 of the first flexible mat 30 and the second flexible mat 32 may also be employed. Although the first and second supports 22, 24 of the secondary modular suspension system 70 are shown in a traditional frame 142 for a seating assembly, it will be understood that this same configuration could be used in a peripheral frame 14 that supports the mesh back 80. It should also be noted that the first flexible mat 30 may also operate as set forth above in relation to the second flexible mat 32 and that both the first flexible mat 30 and the second flexible mat 32 may be vertically adjustable based on user preferences.

Figure 14:
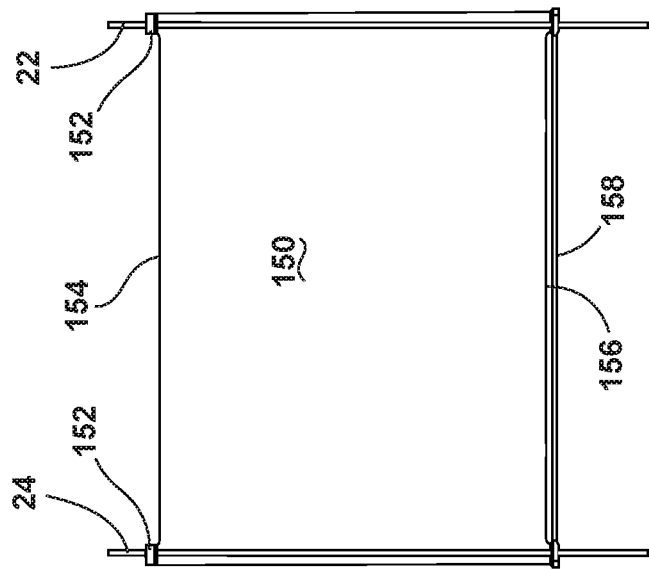
FIG. 14 is a rear elevational view of a flexible mat including a generally flat construction.
Figure 13:
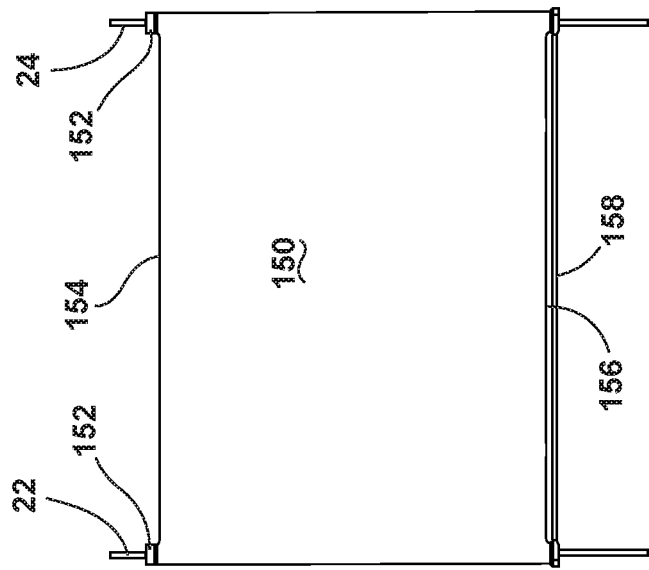
FIG. 13 is a front elevational view of a flexible mat including a generally flat construction.
Figure 15:
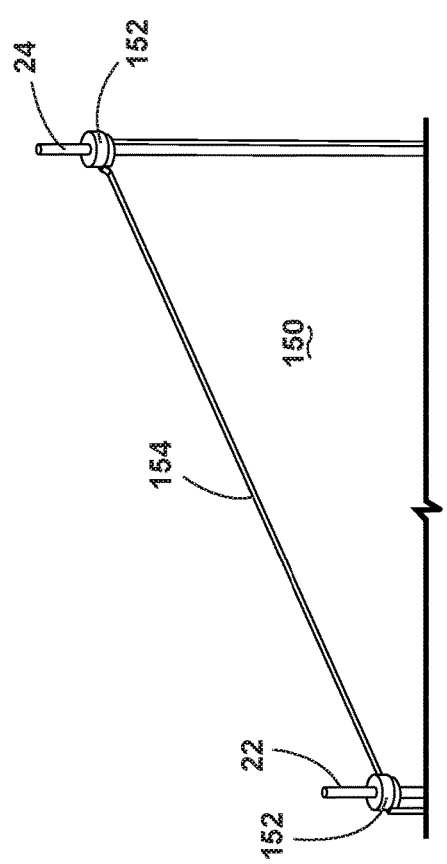
FIG. 15 is a top perspective view of a portion of the flexible mat of FIG. 14 illustrating stoppers disposed on the top end thereof.
Figure 16:
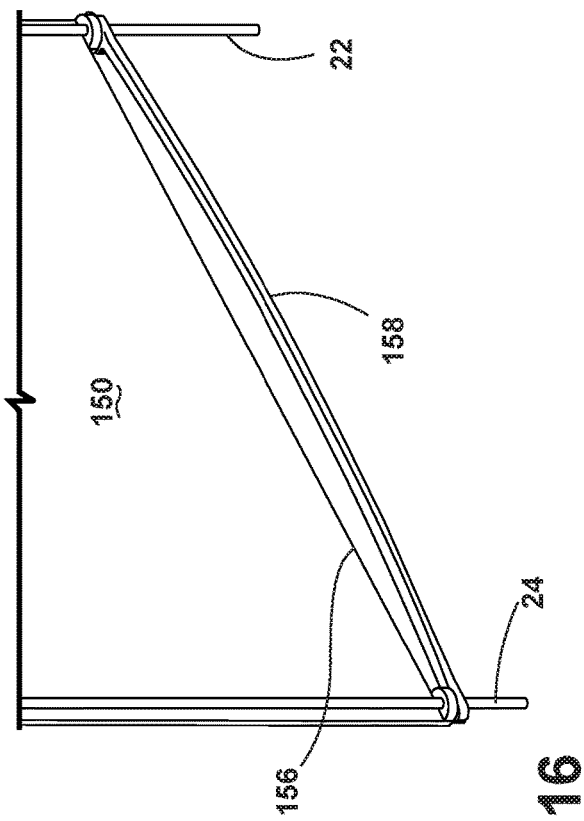
FIG. 16 is a bottom perspective view of a portion of the flexible mat of FIG. 14 illustrating a movable bar disposed at lower portion of the flexible mat.

With reference now to FIGS. 13 and 14, in an alternate construction, a generally flat, flexible polymeric mat 150, may be used in replace of the first flexible mat 30 and a generally flexible polymeric mat 151 may be used to replace the second flexible mat 32 or both. The flexible polymeric mat 150 may work in much the same way as the first flexible mat 30. In the illustrated embodiment, upper stoppers 152 (FIG. 15) are disposed on a top portion 154 of the flexible polymeric mat 150 and prevent the top portion 154 of the flexible polymeric mat 150 from moving. A bottom portion 156 of the flexible polymeric mat 150 (FIG. 16) includes a dynamic transverse bar 158 configured to adjust the bottom portion of the flexible polymeric mat 150 between a low position (flat) and a high position (flexed).

The upper stoppers 152 of the flexible polymeric mat 150 may be arranged at the top or bottom portion of the first and second supports 22, 24. The upper stoppers 152 are configured to prevent movement of the flexible polymeric mat 150. It is generally contemplated that the upper stoppers 152 may be constructed from a polymeric material and may be adhered, fastened, or welded to the first and second supports 22, 24. In addition, the dynamic transverse bar 158 that extends transversely between the first and second supports 22, 24 is configured to move a bottom end of the flexible polymeric mat 150 toward the top portion 154. Although the top portion 154 of the flexible polymeric mat 150 in FIGS. 13-16 is shown as being static, it will be understood that the stoppers 152 may be disposed at the bottom portion 156 of the flexible polymeric mat 150 and that a top portion 154 of the flexible polymeric mat 150 may include the dynamic transverse bar 158. The dynamic transverse bar 158 is configured to be attached to cables which can be manually moved by a motor to draw the bottom portion 156 of the flexible polymeric mat 150 toward the top portion 154.

Figure 18:
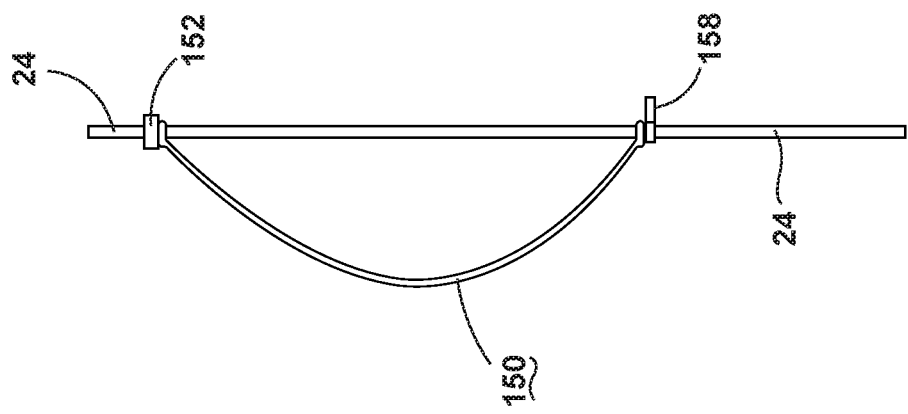
FIG. 18 is a side elevational view of the flexible mat of FIG. 14 in a flexed condition.
Figure 17:
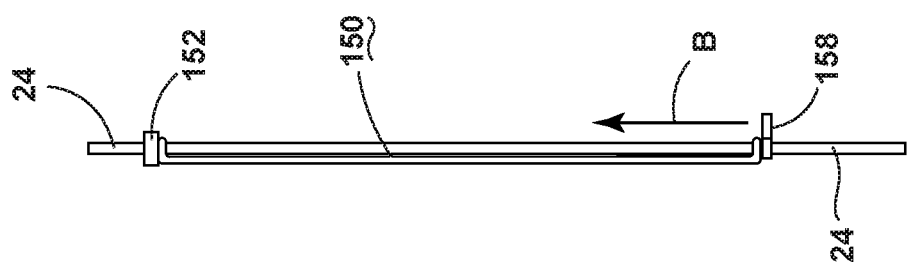
FIG. 17 is a side elevational view of the flexible mat of FIG. 14 in a flat condition.

In use, as illustrated in FIGS. 17 and 18, the dynamic transverse bar 158 may be tied to a tension or compression member to force the dynamic transverse bar 158 upward in the direction of Arrow B. When a preferred flexed condition has been reached (FIG. 18), the flexible polymeric mat 150 will be maintained in the flexed condition until being lowered, as desired by the user, back to the flat condition (FIG. 17). The flexible polymeric mat 151 positioned adjacent the lumbar region 20 will work similarly.

Figure 20:
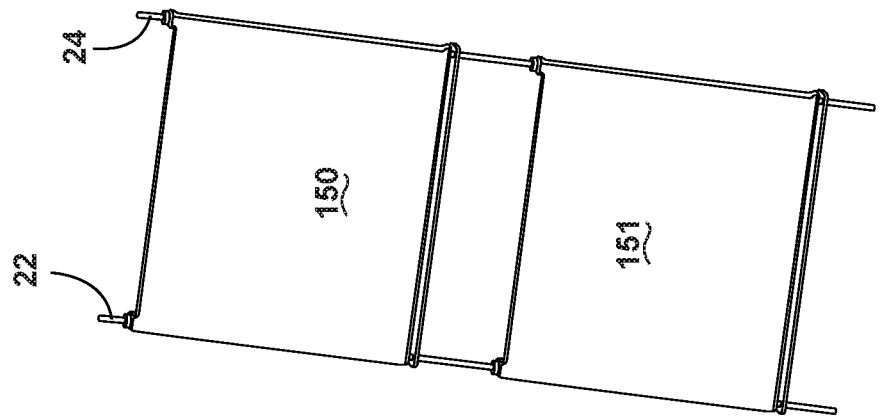
FIG. 20 is a top front perspective view of upper and lower flexible mats for attachment to a seat frame.
Figure 19:
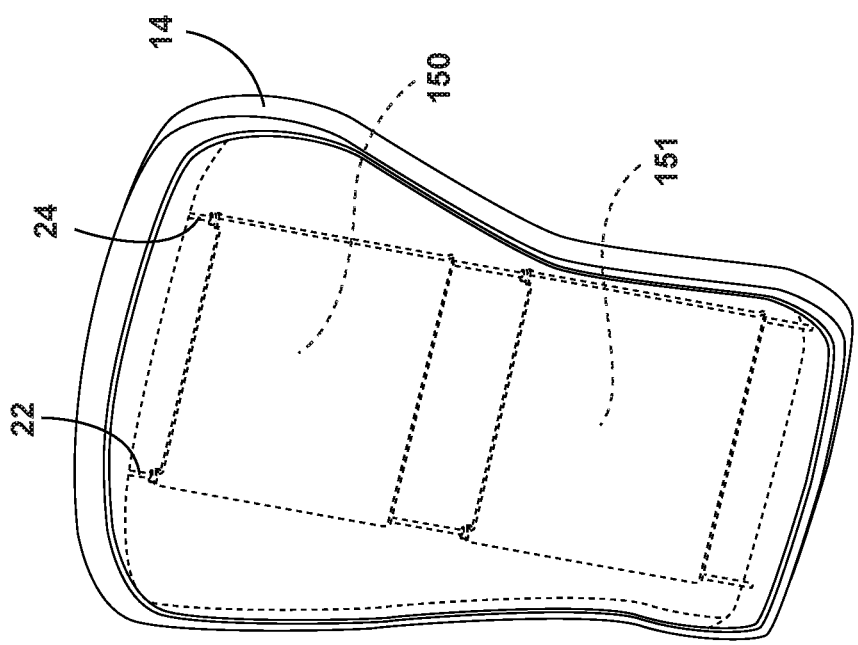
FIG. 19 is a top front perspective view of a seat frame of the present disclosure with upper and lower flexible mats operably coupled therewith.
Figure 21:
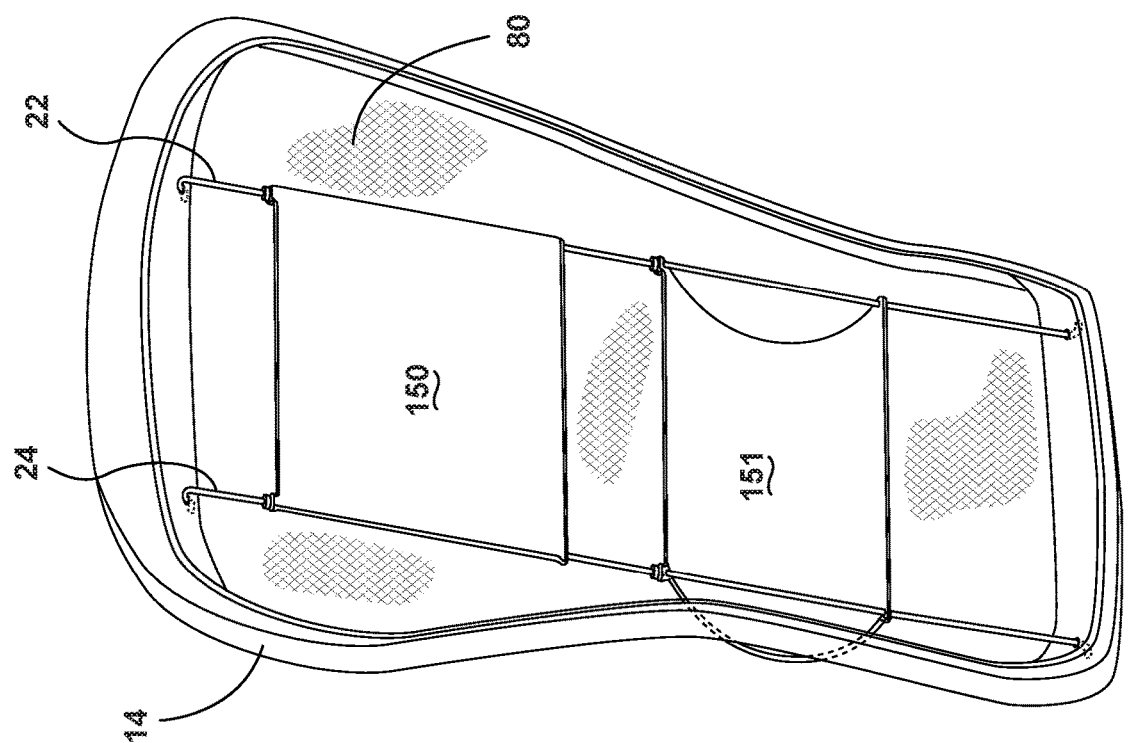
FIG. 21 is a bottom front perspective view of the seat frame of FIG. 19 with the lower flexible mat in a flexed condition.
Figure 23:
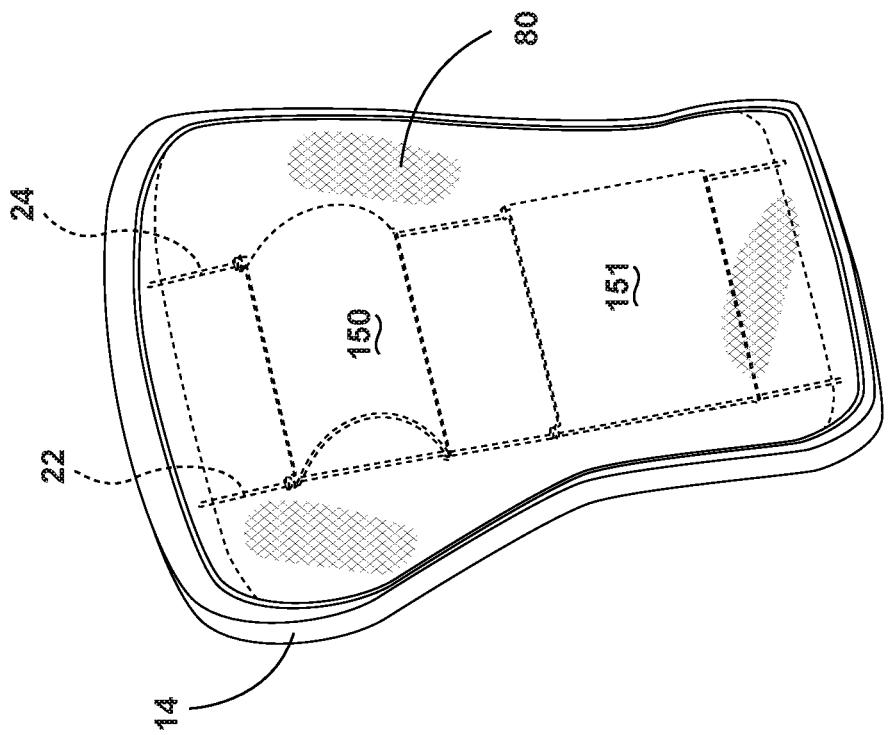
FIG. 23 is a top front perspective view of a seatback of the present disclosure with a thoracic flexible mat in a flexed condition.
Figure 22:
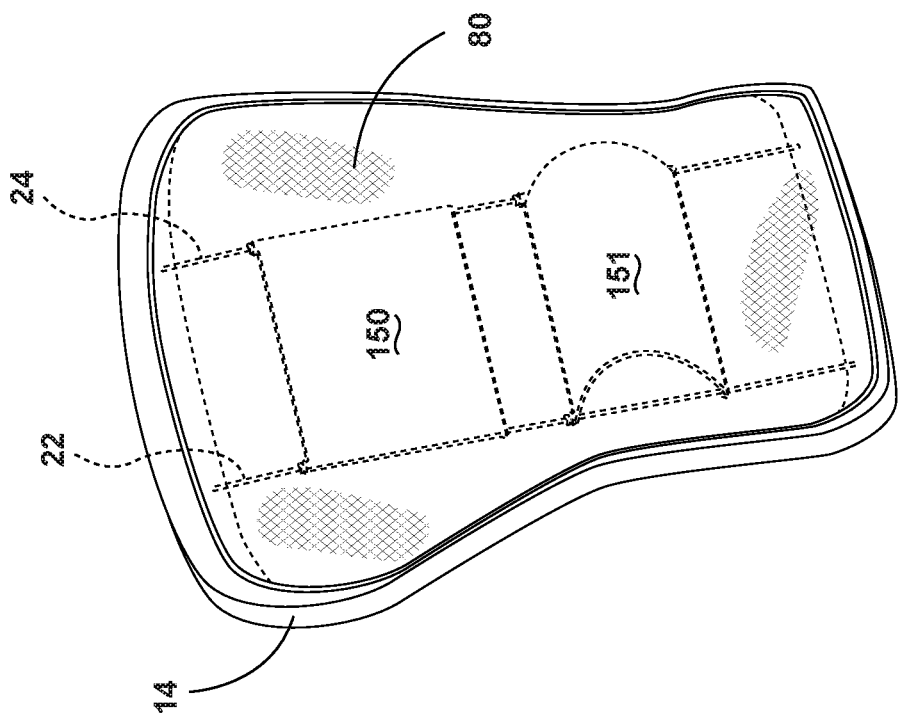
FIG. 22 is a top front perspective view of a seat frame of the present disclosure with a lumbar area in a flexed condition.

With reference now to FIGS. 19 and 20, the flexible polymeric mat 150 may be arranged proximate the thoracic region 18 and the lumbar region 20 of the seatback 12. The flexible polymeric mat 150 can then be adjusted between non-flexed and flexed conditions depending on occupant comfort. As shown in FIGS. 21 and 22, the lumbar region 20 may be adjusted independently from the thoracic region 18. In FIG. 23, the thoracic region 18 is being adjusted with no movement of the lumbar region 20. However, it will be understood that the thoracic region 18 and the lumbar region 20 may be moved simultaneously to the flexed condition, or a position between the flat (non-flexed) condition and fully flexed condition.

Figure 24:
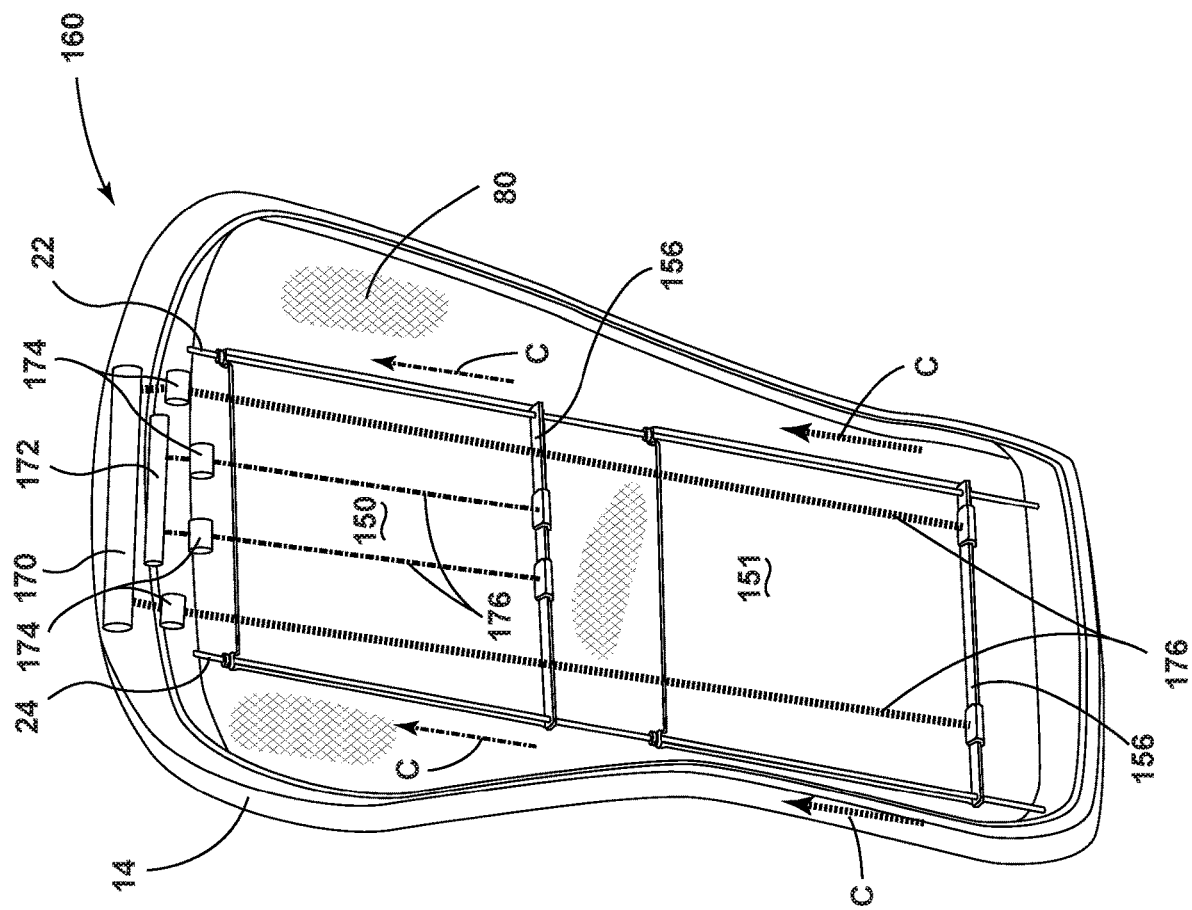
FIG. 24 is a rear perspective view of a seatback with upper and lower flexible mats configured for movement between flexed and flat conditions.
Figure 25:
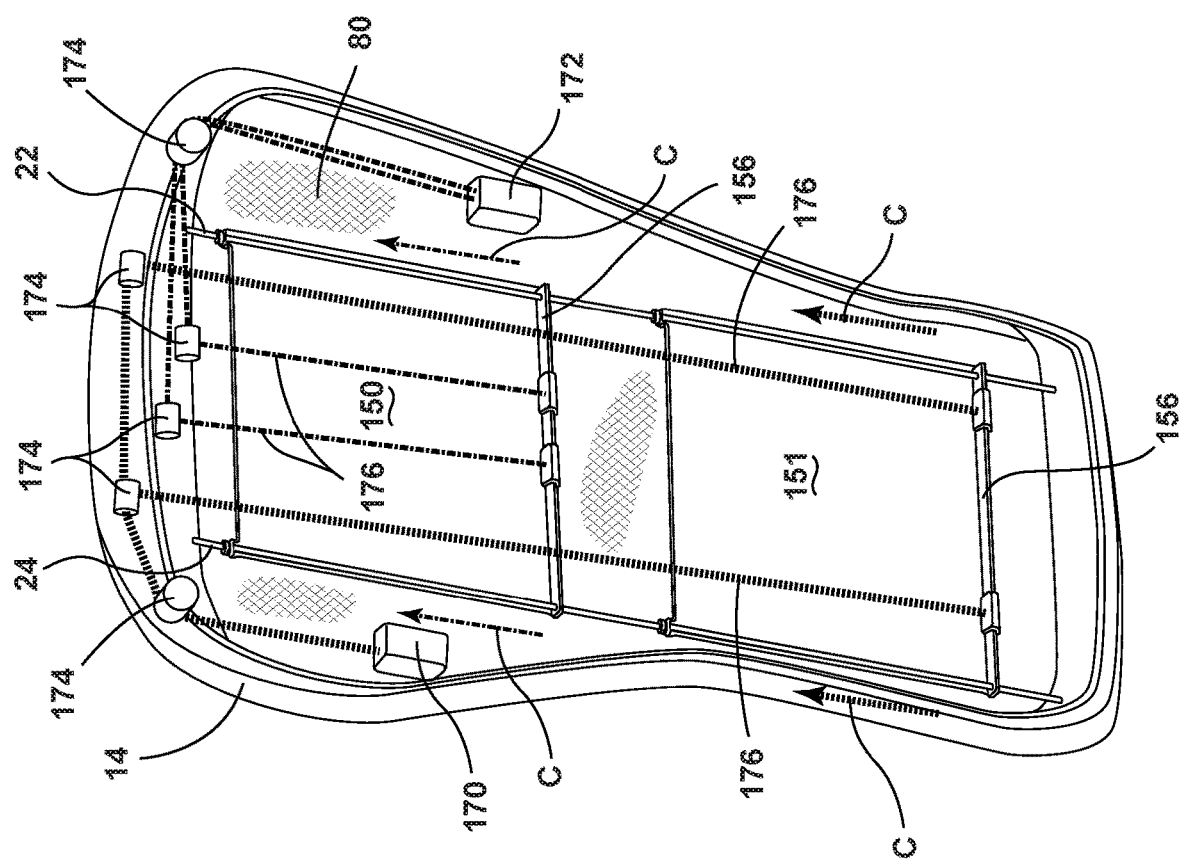
FIG. 25 is an alternate construction for moving upper and lower flexible mats between flexed and flat conditions.

With reference now to FIG. 24, a motorized system 160 is illustrated that includes first and second motors 170, 172. The first motor 170 is disposed above the second motor 172 and is configured to adjust the bottom portion 156 of the flexible polymeric mat 151, which is proximate the lumbar region 20. The second motor 172 is configured for adjusting the bottom portion 156 of the flexible polymeric mat 150, which is proximate the thoracic region 18. Pulleys 174 may be utilized to properly align cables 176 that are drawn upward in the direction of Arrow C by the first and second motors 170, 172. It will also be understood that the cables 176 may be adjusted manually by a lever disposed adjacent to the seat 62. With reference to FIG. 25, the first motor 170 is disposed on a side of the seatback 12 and the second motor 172 is disposed on an opposite side of the seatback 12. The first motor 170, again, is configured to draw the bottom portion 156 of the flexible polymeric mat 151 upward while the second motor 172 is configured to draw the flexible polymeric mat 150 upward. It will be understood that the flexible polymeric mats 150, 151 will be biased to a flat position as a result of the polymeric material being biased to the flat, non-flexed condition.

Figure 26:
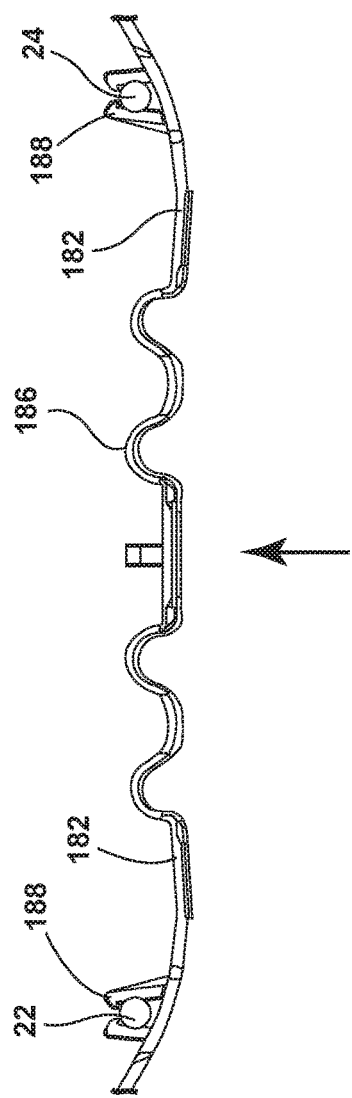
FIG. 26 is a top elevational view of an upper cross support configured for supporting an air mover.
Figure 27:
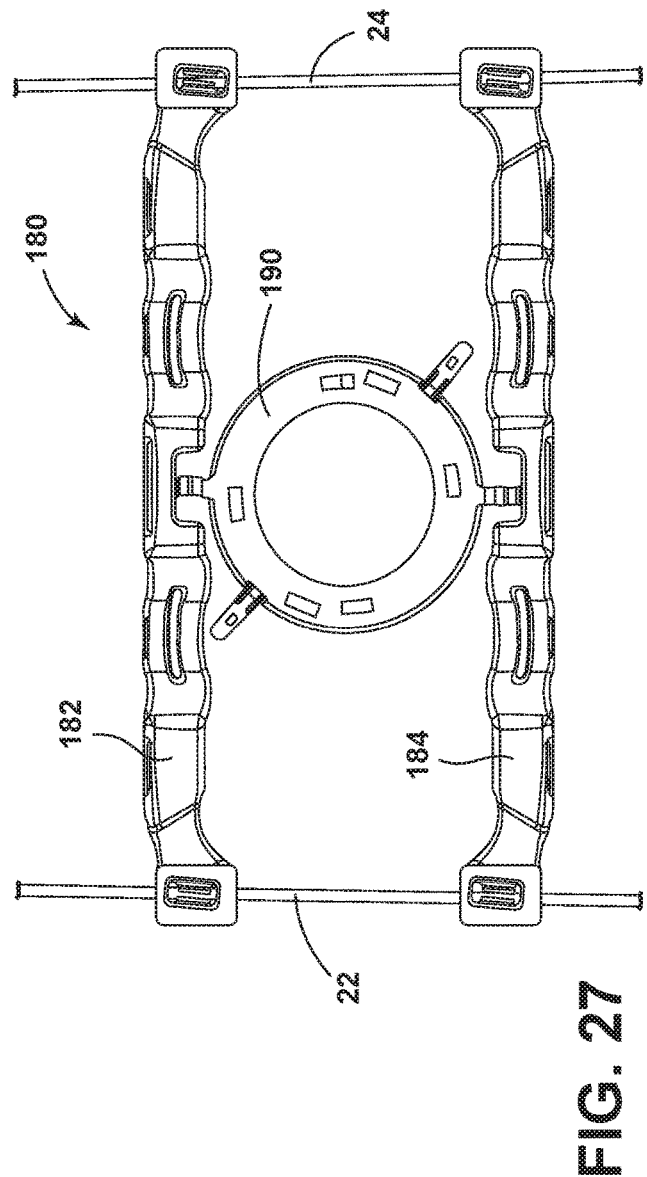
FIG. 27 is a front elevational view of upper and lower cross supports configured to movably adjust along vertical supports and support an air mover.
Figure 28:
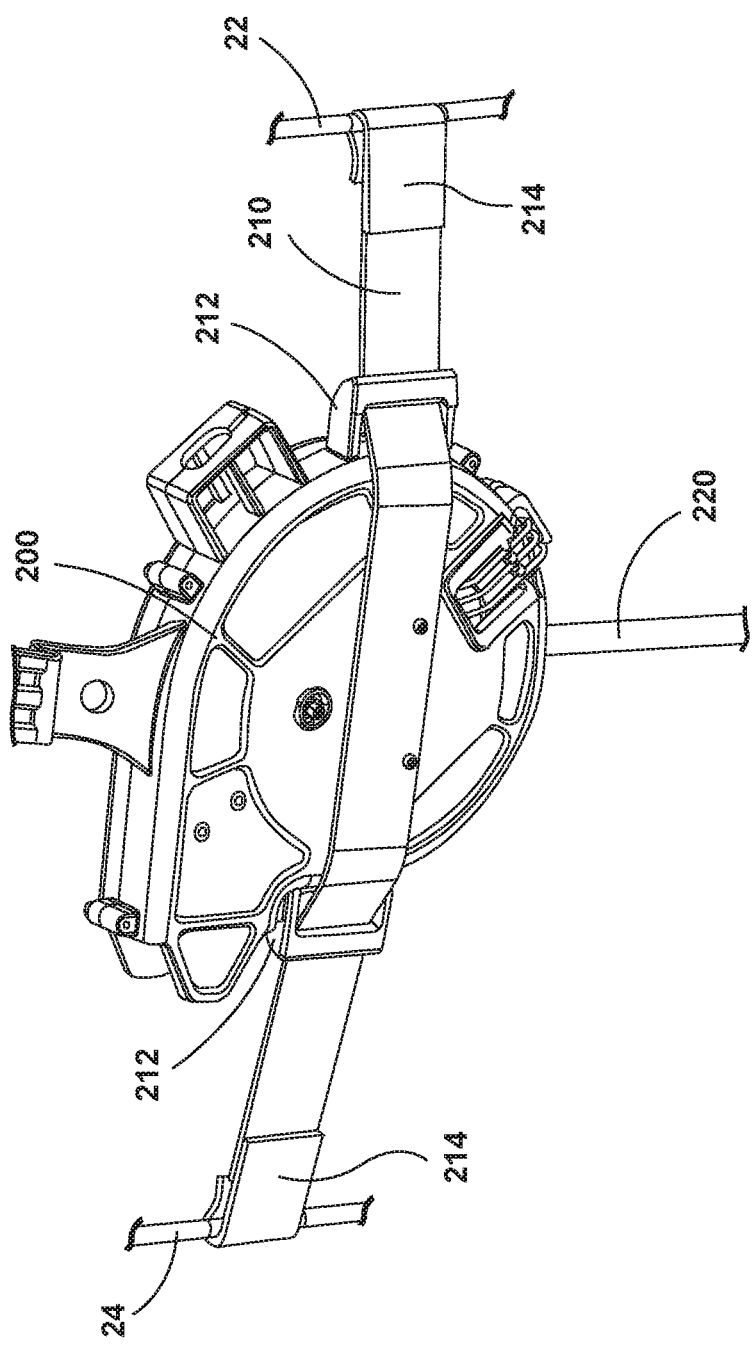
FIG. 28 is an air mover configured for attachment with first and second cross supports.

With reference now to FIGS. 26-28, an air mover assembly 180 may be configured for positioning between the generally flexible polymeric mats 150, 152. The air mover assembly 180 includes adjustable upper and lower cross supports 182, 184 that are configured for movement along the first and second supports 22, 24. The upper and lower cross supports 182, 184 include an undulating cross-section 186, as shown in FIG. 26, that allows for considerable flexure. The upper and lower cross supports 182, 184 also include adjustable hooked ends 188 configured for movement along the first and second supports 22, 24. A receiving member 190, as shown in FIG. 27, is configured to receive an air mover 200, such as that shown in FIG. 28. The receiving member 190 supports the air mover 200, which may be a blower which blows air into the seat 62 and onto the seating surface, or may be a vacuum which draws air from the seating surface.

With reference again to FIG. 28, the air mover 200 may be supported by a single cross-member 210. In this instance, lateral supports 212 of the air mover 200 receive and support the air mover 200 on the single cross-member 210. Ends 214 of the single cross-member 210 engage the first and second supports 22, 24. A power supply line 220 is in communication with the air mover 200.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
   a seatback including a frame extending about a periphery of the seatback, the seatback defining a thoracic region and a lumbar region;
   first and second supports extending from a top portion of the frame to a lower portion of the frame;
   a first flexible mat operably coupled with the first and second supports, the first flexible mat disposed proximate the thoracic region;
   a second flexible mat operably coupled with the first and second supports, the second flexible mat disposed proximate the lumbar region; and
   an air mover disposed between the first flexible mat and the second flexible mat.

2. The seating assembly of claim 1, wherein the first flexible mat and the second flexible mat include a substantially identical construction.

3. The seating assembly of claim 1, wherein corners of the first flexible mat are operably coupled with the first and second supports.

4. The seating assembly of claim 1, wherein each of the first flexible mat and the second flexible mat includes snap features configured to receive the first and second supports.

5. The seating assembly of claim 1, wherein each of the first and second supports are one of a metallic wire member and a metallic spring steel member.

6. The seating assembly of claim 1, wherein the first flexible mat and the second flexible mat are linearly slidable along the first and second supports.

7. The seating assembly of claim 1, wherein the first flexible mat and the second flexible mat flex forward toward a support surface of the seatback.

8. The seating assembly of claim 1, wherein the first flexible mat and the second flexible mat are independently adjustable.

9. The seating assembly of claim 1, wherein a blower extends between upper and lower cross supports that are moveably adjustable vertically along the first and second supports.

10. The seating assembly of claim 9, wherein the upper and lower cross supports include a circular blower receiving area configured to receive the air mover that is in fluid communication with the seatback.

11. The seating assembly of claim 1, wherein each of the first flexible mat and the second flexible mat are operable between an un-flexed condition and a flexed condition, and wherein each of the first flexible mat and the second flexible mat are in a more arcuate configuration when in the flexed condition and in a less arcuate configuration when in the un-flexed condition.

12. The seating assembly of claim 11, wherein each of the first flexible mat and the second flexible mat are configured to flatten and absorb energy during a rear impact collision.

13. The seating assembly of claim 1, further comprising:
    a motor operably coupled with the first flexible mat and the second flexible mat, the motor configured to move each of the first flexible mat and the second flexible mat from an un-flexed condition to a flexed condition.

14. The seating assembly of claim 13, wherein the motor is configured to adjust each of the first flexible mat and the second flexible mat individually.

15. A vehicle seating assembly comprising:
    a seat;
    a seatback operably coupled the seat and including a frame extending about a periphery of the seatback, the seatback defining a thoracic region and a lumbar region;
    an open weave mesh supported by the frame and defining a seat surface interface configured to support a user;
    first and second supports extending from a top portion of the frame to a lower portion of the frame;
    a first flexible mat operably coupled with the first and second supports, the first flexible mat disposed proximate the thoracic region; and
    a second flexible mat operably coupled with the first and second supports, the second flexible mat disposed proximate the lumbar region.

16. The vehicle seating assembly of claim 15, wherein the first flexible mat and the second flexible mat are linearly slidable along the first and second supports.

17. The vehicle seating assembly of claim 15, further comprising:
    a motor operably coupled with the first flexible mat and the second flexible mat, the motor configured to move each of the first flexible mat and the second flexible mat from an un-flexed condition to a flexed condition.

18. The vehicle seating assembly of claim 17, wherein the motor is configured to adjust each of the first flexible mat and the second flexible mat individually.

19. A vehicle seating assembly comprising:
    a seatback including a frame;
    an open weave mesh supported by the frame and defining a seat surface interface;
    first and second supports extending from a top to a bottom of the frame;
    a first flexible mat operably coupled with the first and second supports, and disposed proximate a thoracic region; and a second flexible mat operably coupled with the first and second supports, and disposed proximate a lumbar region.

* * * * *